(12) United States Patent
Mouri et al.

(10) Patent No.: US 6,578,360 B2
(45) Date of Patent: Jun. 17, 2003

(54) MASTER CYLINDER

(75) Inventors: Tomonori Mouri, Yamanashi (JP);
Takato Ogiwara, Yamanashi (JP);
Hiromi Ando, Yamanashi (JP);
Naganori Koshimizu, Yamanashi (JP)

(73) Assignee: Tokico Ltd., Kawasaki (JP)

( * ) Notice: Subject to any disclaimer, the term of this patent is extended or adjusted under 35 U.S.C. 154(b) by 0 days.

(21) Appl. No.: 09/984,794

(22) Filed: Oct. 31, 2001

(65) Prior Publication Data

US 2002/0083709 A1 Jul. 4, 2002

(30) Foreign Application Priority Data

Oct. 31, 2000 (JP) ........................................ 2000-333759

(51) Int. Cl.[7] ................................................ B60T 11/20
(52) U.S. Cl. ........................................ 60/562; 92/168
(58) Field of Search ................ 60/533, 562; 92/165 R, 92/168

(56) References Cited

U.S. PATENT DOCUMENTS 4,887,517 A   12/1989   Shinohara ................. 60/533 X
5,187,934 A * 2/1993   Mori ............................ 60/562
5,243,823 A * 9/1993   Jordan et al. ............. 60/562 X

FOREIGN PATENT DOCUMENTS

GB         979810   * 1/1965   .................. 60/562
JP      11-198793     7/1999

* cited by examiner

Primary Examiner—Edward K. Look
Assistant Examiner—Michael Leslie
(74) Attorney, Agent, or Firm—Wenderoth, Lind & Ponack, L.L.P.

(57) ABSTRACT

A master cylinder including a cylinder having one end open to the outside. A secondary piston guide ring, a sleeve and a primary piston guide ring are adapted to be fitted in this order into the cylinder from the one open end. A piston is slidably fitted in an axial direction of the cylinder, into each of the secondary piston guide ring, the sleeve and the primary piston guide ring. A retainer is provided at the open end of the cylinder, and adapted to abut against the primary piston guide ring so as to prevent escape of the primary piston guide ring from the cylinder. An elastic member is provided between a rearward end portion of the sleeve and a forward end portion of the primary piston guide ring.

5 Claims, 3 Drawing Sheets

MASTER CYLINDER

BACKGROUND OF THE INVENTION

The present invention relates to a master cylinder which generates a fluid pressure for operating a brake.

As an example of a conventional master cylinder, there can be mentioned that which is disclosed in Unexamined Japanese Patent Application Public Disclosure (Kokai) No. 2-136363.

This master cylinder comprises a cylinder having one end open to the outside and the other end closed, and a secondary piston and a primary piston slidably disposed at a forward position (on a side of the closed end) and a rearward position (on a side of the open end) in the cylinder. Each piston forms a pressure chamber between itself and the cylinder, so as to generate a fluid pressure. A secondary piston guide ring, a sleeve and a primary piston guide ring are slidably fitted into the cylinder, in this order, from the open end to be provided at the forward position, a central position and the rearward position in the cylinder, respectively. A holder which abuts against the primary piston guide ring is provided at the open end of the cylinder to prevent escape of the primary piston guide ring, the sleeve and the secondary piston guide ring from the cylinder.

The secondary piston guide ring and the primary piston guide ring are adapted to axially and slidably guide the secondary piston and the primary piston. Each piston guide ring forms a fluid supply chamber between itself and an outer circumferential surface of the piston. The piston guide ring includes a communication port having one end open to the fluid supply chamber and the other end open at an outer circumferential surface of the ring. Further, the sleeve forms communication passages which allow communication between the communication ports of the secondary and primary piston guide rings and a reservoir.

However, the conventional master cylinder of Kokai No. 2-136363 has the following problems.

In this master cylinder, to prevent an excessive assembly load acting on the primary piston guide ring, the sleeve and the secondary piston, and to prevent axial play of these elements, an elastic member is provided between the secondary piston guide ring and the sleeve. However, in the case that a large force is applied in a braking operation, the sleeve moves toward the open end of the cylinder under the effect of fluid pressure generated by the primary piston, which is moved toward the closed end of the cylinder by a brake pedal. More particularly, fluid pressure works in the gap between the rear end of the secondary piston guide ring and the forward end of the sleeve where the elastic member is clamped, to thereby urge the secondary piston guide ring forwardly toward the closed end of the cylinder and the sleeve rearwardly toward the open end of the cylinder, respectively. Consequently, the play is not completely eliminated and the holder is pressed and instantaneously deformed. To prevent such deformation, the holder must be manufactured using an expensive high strength material, and be provided with a sufficient wall thickness. Accordingly, not only are costs increased but the size of the master cylinder must be increased to accommodate the extra wall thickness.

To overcome these problems, the present invention has been made. It is an object of the present invention to provide a low-cost, reduced size master cylinder in which deformation of a holder is prevented and a play of a sleeve is eliminated.

SUMMARY OF THE INVENTION

The present invention provides a master cylinder comprising a cylinder having one end open to the outside. A secondary piston guide ring, a sleeve and a primary piston guide ring are adapted to be fitted in this order into the cylinder from the one open end. A piston is slidably fitted in an axial direction of the cylinder, into each of the secondary piston guide ring, the sleeve and the primary piston guide ring. A retaining member is provided at the open end of the cylinder, and adapted to abut against the primary piston guide ring and prevent escape of the primary piston guide ring from the cylinder. An elastic member is provided between a rearwardly facing surface or rearward end portion of the sleeve and an associated forwardly facing surface or forward end portion of the primary piston guide ring.

Thus, in the present invention, the elastic member is provided between the sleeve and the primary piston guide ring. Therefore, under generation of a large force in a braking operation, unlike in the prior art, the sleeve does not play either forwardly or rearwardly. Furthermore, since fluid pressure does not create significant force between the sleeve and primary piston guide ring, the holder is not subjected to significant force and, therefore, it need not be made particularly strong.

BRIEF DESCRIPTION OF THE DRAWINGS

The accompanying

DETAILED DESCRIPTION OF THE INVENTION

Hereinbelow, description is made in detail with regard to a master cylinder according to an embodiment of the present invention.

Figure 1:
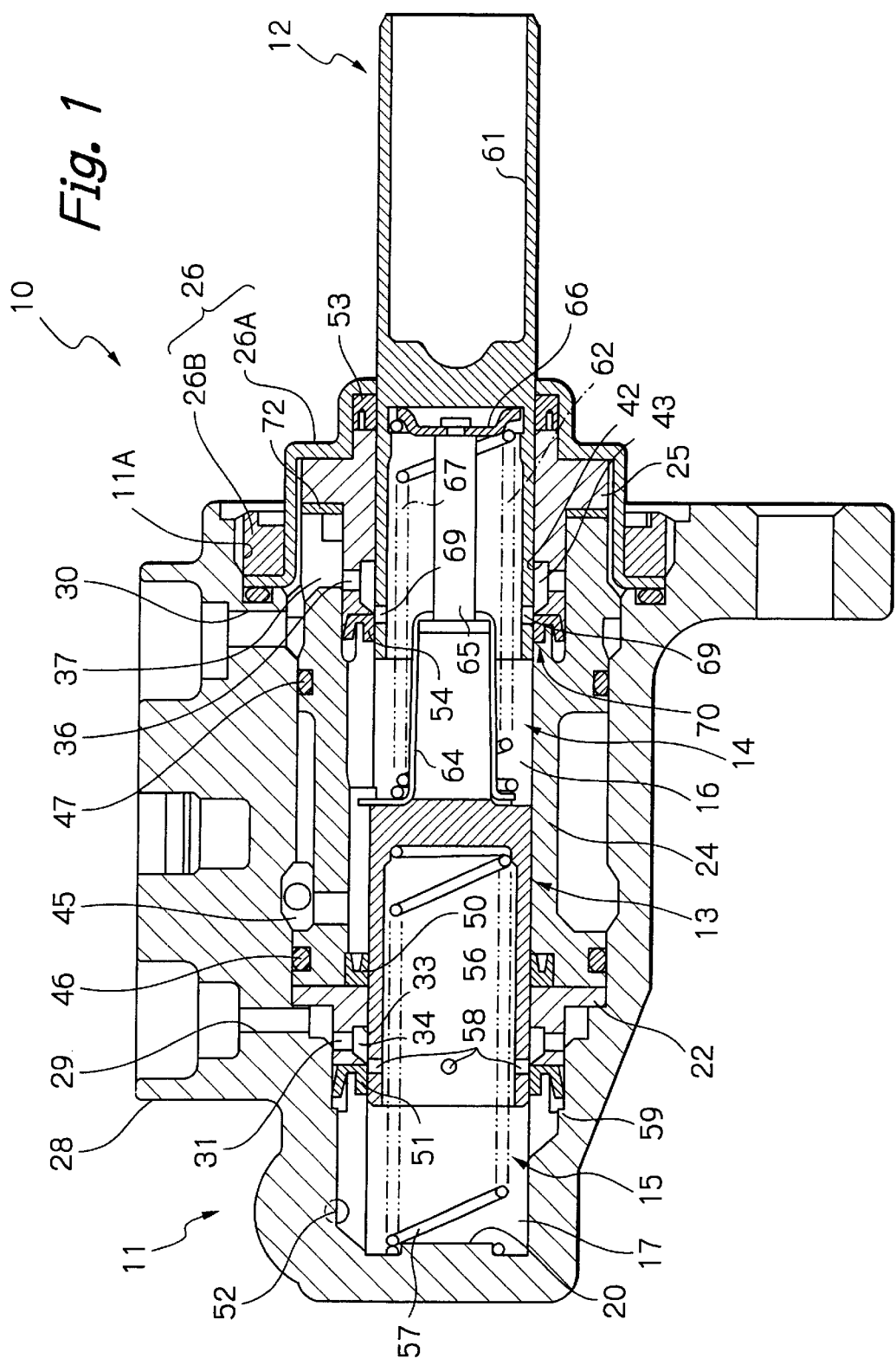
FIGS. 1–3 are cross-sectional views showing an entire construction of a master cylinder according to the present invention.
Figure 2:
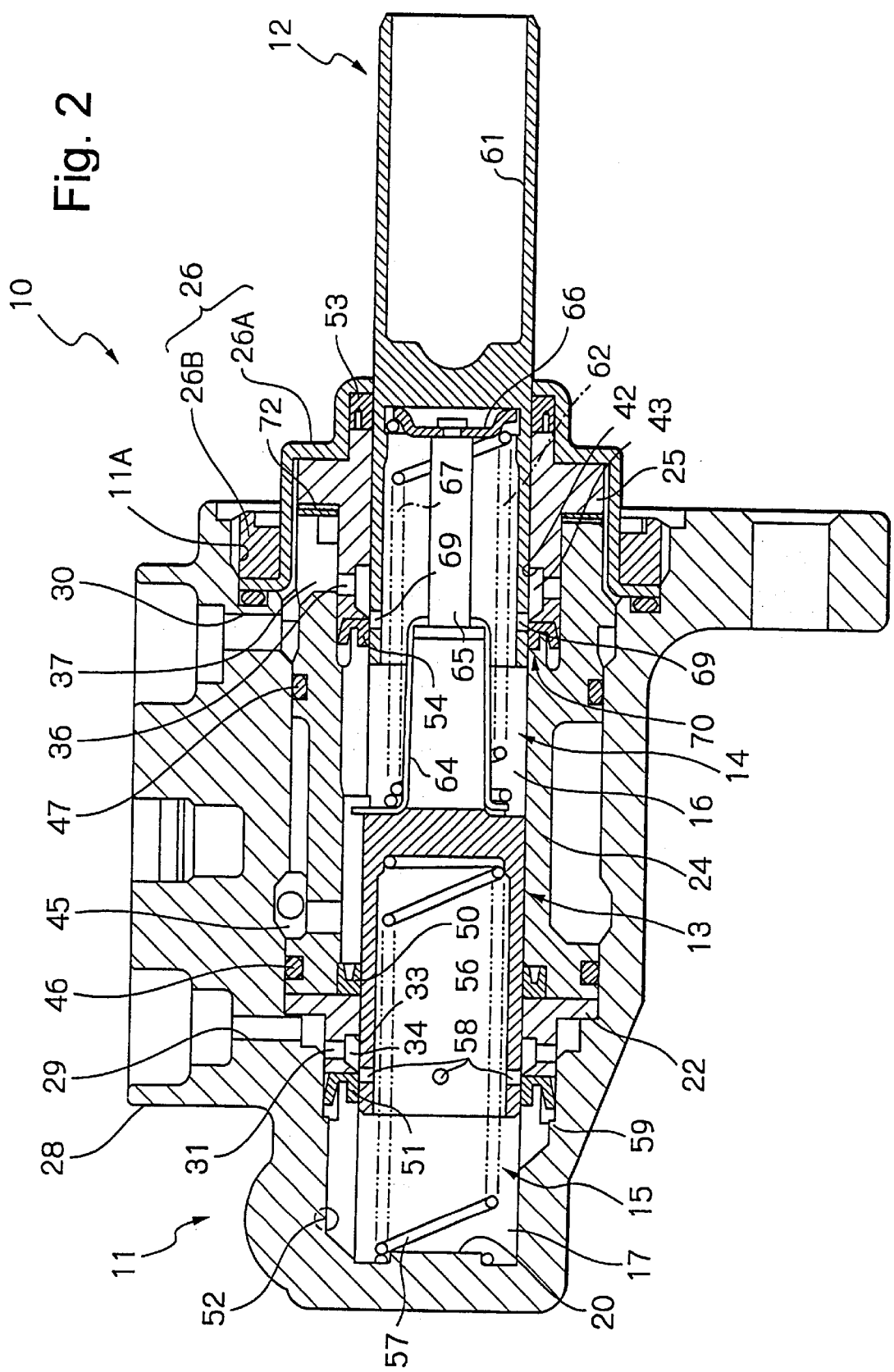
Figure 3:
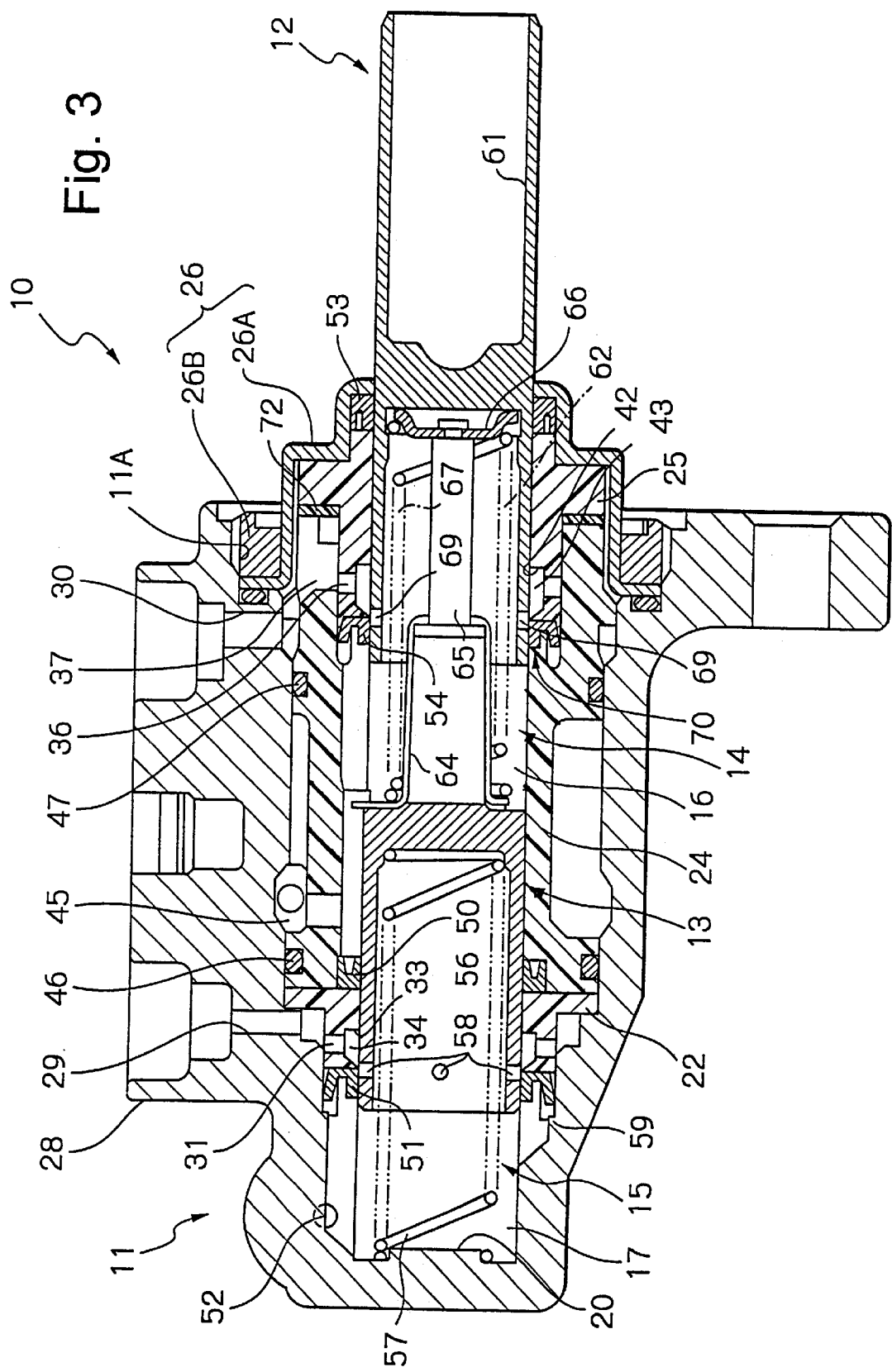

Each of the accompanying figures show an entire construction of a master cylinder 10. In FIGS. 1–3, reference numeral 11 denotes a cylinder which has a generally cylindrical form, with one end being open and the other end closed; and reference numeral 12 denotes a primary piston axially fitted into the cylinder 11 and slidably disposed on a side of the open end of the cylinder 11 (i.e., on a right side in FIG. 1). Reference numeral 13 denotes a secondary piston axially fitted into the cylinder 11 and slidably disposed on a side of the closed end of the cylinder 11 (i.e., on a left side in FIG. 1).

An initial space-maintaining mechanism portion 14 is provided between the primary piston 12 and the secondary piston 13. The initial space-maintaining mechanism portion 14 defines a space between the primary piston 12 and the secondary piston 13 in an initial state in which no input is applied from a brake pedal (not shown) (from the right side in FIG. 1). The position of each element of the master cylinder 10 in the initial state is hereinafter referred to as "the initial position". An initial space-maintaining mechanism portion 15 is provided between the secondary piston 13 and the closed end of the cylinder 11, so as to define a space therebetween in the initial state. A primary pressure chamber 16 is formed by the primary piston 12, the secondary piston 13 and the cylinder 11; and a secondary pressure chamber 17 is formed by the secondary piston 13 and the closed end of the cylinder 11.

A depressing force applied to the brake pedal is increased, for example, by a booster. This force acts on the primary piston 12 in a direction of the secondary piston 13.

Consequently, the primary piston 12 moves in a forward direction toward the primary pressure chamber 16; and the secondary piston 13 moves in the forward direction toward the secondary pressure chamber 17. When the brake pedal is released, the primary piston 12 and the secondary piston 13 move in a rearward direction. In the above description, "forward direction" means a leftward direction as viewed in FIG. 1 and "rearward direction" means a rightward direction as viewed in FIG. 1. In the following description, the directions indicated by the terms "forward" and "rearward" should be understood accordingly.

A cylinder bore 20 having one end closed is formed in the cylinder 11. The cylinder bore 20 contains a secondary piston guide ring 22 in a generally annular form into which the secondary piston 13 is slidably fitted, a generally cylindrical sleeve 24 into which the secondary piston 13 and the primary piston 12 are slidably fitted and a primary piston guide ring 25 in a generally cylindrical form into which the primary piston 12 is slidably fitted. The secondary piston guide ring 22, the sleeve 24 and the primary piston guide ring 25 are fitted into the cylinder bore 20, in this order, from the open end. That is, the secondary piston guide ring 22 is located at a position closest to the closed end of the cylinder bore 20 in a coaxial relationship to the cylinder bore 20; the sleeve 24 is disposed adjacent to the secondary piston guide ring 22 on a rear side of the guide ring 22 in a coaxial relationship to the cylinder bore 20; and the primary piston guide ring 25 is located on a rear side of the sleeve 24 in a coaxial relationship to the sleeve 24.

A retaining means 26 is provided at the open end of the cylinder 11. The retaining means 26 abuts against a rear end surface of the primary piston guide ring 25 and prevents escape of the primary piston guide ring 25, the sleeve 24 and the secondary piston guide ring 22 from the cylinder 11. The retaining means 26 comprises a holder 26A and a retaining ring 26B. The holder 26A is fitted on an exterior of a rearward end portion of the sleeve 24 while abutting against the rear end surface of the primary piston guide ring 25. The retaining ring 26B is threadably engaged with an internally threaded portion 11A, which is formed in an inner circumferential surface of a recessed portion at the open end of the cylinder 11, to thereby externally hold a flange portion of the holder 26A.

A mounting portion 28 for mounting of a reservoir is formed in the cylinder 11. The mounting portion 28 includes two communication passages 29 and 30 arranged in a front to rear direction of the mounting portion 28. The communication passages 29 and 30 independently communicate with an inside of the reservoir.

The front-side communication passage 29, that is, the secondary-side communication passage 29 forms bores on a side of the reservoir; and also forms an annular portion between an outer circumferential surface of the secondary piston guide ring 22 and an inner circumferential surface of the cylinder bore 20 of the cylinder 11 on a side opposite to the reservoir. The secondary piston guide ring 22 includes a plurality of communication ports 31 radially extending through the secondary piston guide ring 22, which are arranged in a circumferential direction at a predetermined pitch. The communication ports 31 always communicate with the annular portion of the communication passage 29. In an inner circumferential surface of the secondary piston guide ring 22, an annularly recessed portion 33 having a diameter larger than an outer diameter of the secondary piston 13 is formed, thereby forming an annular fluid supply chamber 34 between the annularly recessed portion 33 of the secondary piston guide ring 22 and an outer circumferential surface of the secondary piston 13. All of the communication ports 31 are open to the annularly recessed portion 33, and therefore always communicate with the fluid supply chamber 34.

As shown in the figure, the rear-side communication passage 30, that is, the primary-side communication passage 30 also forms bores on a side of the reservoir and forms an annular portion between outer circumferential surfaces of the primary piston guide ring 25 and the sleeve 24 and inner circumferential surfaces of the holder 26A and the cylinder bore 20 of the cylinder 11 on a side opposite to the reservoir. The primary piston guide ring 25 includes, at its portion having an axially slidable fit with the sleeve 24, a plurality of communication ports 36 radially extending through the primary piston guide ring 25 and arranged in a circumferential direction at a predetermined pitch. The sleeve 24 includes a plurality of recessed portions 37 which are recessed in an axial direction from the rearward end portion of the sleeve 24, and form parts of the communication passage 30 at positions corresponding to the communication ports 36.

As shown in the Figure, in an inner circumferential surface of the primary piston guide ring 25, an annularly recessed portion 42 having a diameter larger than an outer diameter of the primary piston 12 is formed, to thereby form an annular fluid supply chamber 43 between the annularly recessed portion 42 of the primary piston guide ring 25 and an outer circumferential surface of the primary piston 12. The communication ports 36 of the primary piston guide ring 25 are open to the annularly recessed portion 42, and therefore always communicate with the fluid supply chamber 43.

The sleeve 24 includes a fluid chamber 45. The fluid chamber 45 always communicates with the primary pressure chamber 16 through a gap between the secondary piston 13 and the sleeve 24, while communicating with a brake pipe (not shown) via passage means extending through the cylinder 11. Annular seal members 46 and 47 are provided on an outer circumferential surface of a front portion and a central portion of the sleeve 24, to prevent the fluid chamber 45 from communicating with the communication passage 29 and the communication passage 30 through a gap between the cylinder bore 20 of the cylinder 11 and the sleeve 24.

An annular seal member 50 which has a generally C-shaped cross-section taken along the axis thereof is provided between the sleeve 24 and the secondary piston 13, to prevent communication between the fluid supply chamber 34 and the fluid chamber 45 through a gap between the secondary piston 13 and the sleeve 24. The seal member 50 is disposed, such that its open end, in cross-section, is located on a side of the fluid chamber 45. The seal member 50 also prevents the pressure in the primary pressure chamber 16 from being transmitted to the gap between the secondary piston guide ring 22 and the sleeve 24.

An annular cup seal 51 which has a generally C-shaped cross-section taken along the axis thereof is held between the inner circumferential surface of the cylinder bore 20, the secondary piston guide ring 22 and the secondary piston 13, so as to be capable of making sliding contact with the outer circumferential surface of the secondary piston 13. The cup seal 51 prevents communication between the fluid supply chamber 34 and the secondary pressure chamber 17 through a gap between the secondary piston guide ring 22, and the inner circumferential surface of the cylinder bore 20 and the secondary piston 13. In other words, the cup seal 51 divides the fluid supply chamber 34 from the secondary pressure chamber 17. The cup seal 51 is disposed, such that its open end, in cross-section, is located on a side of the secondary pressure chamber 17. The secondary pressure chamber 17 communicates with a brake pipe (not shown) through a passage 52 formed in the cylinder 11.

An annular seal member 53 which has a generally C-shaped cross-section taken along the axis thereof is held between the holder 26A, the primary piston guide ring 25 and the primary piston 12, so as to prevent the fluid supply chamber 43 from communicating with the outside through a gap between the primary piston guide ring 25, and the holder 26A and the primary piston 12. The seal member 53 is disposed, such that its open end, in cross-section, is located on a side of the fluid supply chamber 43.

An annular cup seal 54 which has a generally C-shaped cross-section taken along the axis thereof is held between the inner circumferential surface of the sleeve 24, the primary piston guide ring 25 and the primary piston 12, so as to be capable of making sliding contact with the outer circumferential surface of the primary piston 12. The cup seal 54 prevents communication between the fluid supply chamber 43 and the primary pressure chamber 16 through a gap between the primary piston guide ring 25, and the sleeve 24 and the primary piston 12. In other words, the cup seal 54 divides the fluid supply chamber 43 from the primary pressure chamber 16. The cup seal 54 is disposed, such that its open end, in cross-section, is located on a side of the primary pressure chamber 16.

A bore 56 having one end closed is formed at a front portion of the secondary piston 13 in the direction of its axis. The initial space-maintaining mechanism portion 15 is provided in the bore 56.

The initial space-maintaining mechanism portion 15 comprises a spring 57, which has one end abutting against the closed end of the cylinder 11, and the other end abutting against the closed end of the bore 56 of the secondary piston 13, and biases the closed end of the cylinder 11 and the closed end of the bore 56 in opposite directions.

A plurality of relief ports 58 are arranged in the vicinity of a forward end portion of the secondary piston 13 in a circumferential direction at a predetermined pitch. The relief ports 58 radially extend from the bore 56 through the secondary piston 13 and are always open to the secondary pressure chamber 17. The relief ports 58 enable communication between the secondary pressure chamber 17 and the fluid supply chamber 34, depending on the position of the secondary piston 13. The cylinder 11 includes an annular stepped portion 59 formed in the inner circumferential surface thereof at a position forward of the relief ports 58, so as to hold the cup seal 59.

A bore 61 is formed at a rear portion of the primary piston 12 in the direction of its axis. An output shaft of the booster (not shown) is provided in the bore 61. A force applied to the brake pedal is increased by the booster and acts on the primary piston 12 through the output shaft.

A bore 62 having one end closed is formed at a front portion of the primary piston 12 in the direction of its axis. The initial space-maintaining mechanism portion 14 is provided in the bore 62.

The initial space-maintaining mechanism portion 14 comprises a retainer 64 which abuts against a rear end surface of the secondary piston 13 and a connecting rod 65 which is fitted into the retainer 64 and extends toward the primary piston 12. The connecting rod 65 is capable of free movement in the forward direction relative to the retainer 64 and is not capable of movement in the rearward direction relative to the retainer 64 from a predetermined position. The initial space-maintaining mechanism portion 14 further comprises a retainer 66 which is fitted on the end portion of the connecting rod 65 on a side of the primary piston 12 and abuts against the closed end of the bore 62 of the primary piston 12, and a spring 67 which biases the retainer 64 and the retainer 66 in opposite directions.

By means of the initial space-maintaining mechanism portions 14 and 15, the initial positions of the primary piston 12 and the secondary piston 13 are set to predetermined positions.

A plurality of relief ports 69 are arranged in the vicinity of a forward end portion of the primary piston 12 in a circumferential direction at a predetermined pitch. The relief ports 69 radially extend from the bore 62 through the primary piston 12 and are always open to the primary pressure chamber 16. The relief ports 69 enable communication between the primary pressure chamber 16 and the fluid supply chamber 43, depending on the position of the primary piston 12. The sleeve 24 includes an annular stepped portion 70 formed in the inner circumferential surface thereof at a position forward of the relief ports 69, so as to hold the cup seal 54.

An elastic member 72 is provided between the rearward end portion of the sleeve 24 and a forward end portion of the primary piston guide ring 25.

The elastic member 72 is used to avoid the secondary piston guide ring 22 and the sleeve 24 being subjected to an excessive assembly load, and suppress any axial play of the secondary piston guide ring 22 and the sleeve 24. As the elastic member 72, use is made of, for example, a corrugated or waved washer (see FIG. 2) made of a metal (see FIGS. 1–2) or a resin (see FIG. 3).

An operation of the master cylinder 10 arranged as mentioned above is described below in detail.

A depressing force applied to the brake pedal is increased by the booster, and an output of the booster is applied to the primary piston 12 and is in turn applied to the secondary piston 13 through the initial space-maintaining mechanism portion 14. Consequently, the primary piston 12 and the secondary piston 13 move forward from their initial positions. In this instance, the cup seal 54 functions to prevent communication between the primary pressure chamber 16 and the fluid supply chamber 43 through the relief ports 69, and a brake fluid in the primary pressure chamber 16 is pressed by the primary piston 12, to thereby generate a fluid pressure. At the same time, the cup seal 51 prevents communication between the secondary pressure chamber 17 and the fluid supply chamber 34 through the relief ports 58, and a brake fluid in the secondary pressure chamber 17 is pressed by the secondary piston 13, to thereby generate a fluid pressure.

When the brake pedal is released, the primary piston 12 and the secondary piston 13 return to their initial positions shown in the Figure.

In assembling the guide rings 22 and 25 and the sleeve 24 in the cylinder bore 20 of the cylinder 11, the secondary piston guide ring 22, the sleeve 24 and the primary piston guide ring 25 are fitted into the cylinder 11 from the open end thereof in this order. They are fastened to each other by the retaining ring 26B after the holder 26A of the retaining means 26 is externally applied to the cylinder 11. In this instance, even when a fastening force of the retaining ring 26B exceeds a predetermined level, the elastic member 72, which is provided between the rearward end portion of the sleeve 24 and the forward end portion of the primary piston guide ring 25, is subject to deformation and suppresses the effect of the fastening force. Therefore, the secondary piston guide ring 22, the sleeve 24 and the primary piston guide ring 25 are not subject to an excessively high assembly load, and buckling and rupture of the guide rings 22 and 25 and the sleeve 24 does not occur.

Further, even when the fastening force of the retaining ring 26B slightly falls below the predetermined level, axial play of the secondary piston guide ring 22, the sleeve 24 and the primary piston guide ring 25 is prevented by the elastic member 72 provided between the rearward end portion of the sleeve 24 and the forward end portion of the primary piston guide ring 25.

During braking, when the primary piston 12 is moved in the forward direction under the force generated by depressing the brake pedal, the sleeve 24 is subject to a force acting in the forward direction, which is generated by the fluid pressure acting between the sleeve 24 and the primary piston guide ring 25 and the frictional force generated between the sleeve 24 and the primary piston 12. However, the forward end portion of the sleeve 24 directly abuts against the secondary piston guide ring 22, and prevents the sleeve 24 from moving in the forward direction. In this way, axial play of the sleeve is prevented. This was difficult to achieve in the conventional technique in which an elastic member is provided at a portion corresponding to a position between the secondary piston guide ring 22 and the sleeve 24.

When the pressure in the primary pressure chamber 16 becomes high, a force acting in the rearward direction is applied to the primary piston guide ring 25. At this time, however, the primary piston guide ring 25 has already been subjected to a force transmitted through the elastic member 72 and acting in the rearward direction. Therefore, play of the primary piston guide ring 25 is prevented. It is to be noted that an area of a pressure-receiving surface of the primary piston guide ring 25 is small, so that the effect of a force acting on the retaining means 26 in the rearward direction, resulting from pressure generated in the primary pressure chamber 16, is minimized.

In the present invention, the pressure in the primary pressure chamber 16 does not act between the secondary piston guide ring 22 and the sleeve 24. Therefore, the sleeve 24 is not moved in the rearward direction and the retaining means 26 is not subject to any excessive force.

In addition, in the above-mentioned embodiment, the seal members 46 and 47 are provided between the outer circumferential surface of the front portion and the central portion of the sleeve 24 and the inner circumferential surface of the cylinder bore 20. Therefore, even when the pressure in the primary pressure chamber 16 becomes high during braking, the sleeve 24 is not subject to a force which causes movement of the sleeve 24 in either the forward direction (a direction of the closed end of the cylinder) or the rearward direction (a direction of the open end of the cylinder) under the effect of pressure in the primary pressure chamber 16. In other words, because the seal member 46 and the seal member 47 are provided in contact with portions of the cylinder bore 20 having the same diameter, a rearwardly facing pressure-receiving surface and a forwardly facing pressure-receiving surface in the fluid chamber 45 have the same area, so that an axial force applied to the sleeve 24 under the effect of pressure in the fluid chamber 45 is balanced.

Thus, even when a fluid pressure during braking becomes high, no substantial axial force acts to move any of the sleeve 24, the secondary piston guide ring 22 and the primary piston guide ring 25. Therefore, even when the sleeve 24 and the guide rings 22 and 25 are formed using a plastic material (see FIG. 3), there is no possibility that the fastening of the retaining ring 26B of the retaining means 26 relative to the cylinder 11 will become loose due to creep (alteration of shape caused by constant stress) of the resin material.

It should be noted that if either the seal member 46 or the seal member 47 is provided on the secondary piston guide ring 22 or the primary piston guide ring 25, the sleeve 24 is subject to a force which causes movement of the sleeve 24 in the forward direction or the rearward direction, under the effect of high fluid pressure in the primary pressure chamber 16 generated during braking.

As has been described, in the master cylinder of the present invention, the retaining means is not substantially affected by a force to which it is subjected as a result of pressure generated by the piston. Further, since the elastic member is provided between the rearward end portion of the sleeve and the forward end portion of the primary piston guide ring, when the sleeve is subject to a force as a result of pressure generated by the piston during a braking operation, no play of the sleeve exists.

What is claimed is:

1. A master cylinder comprising:
   a cylinder having one end open to the outside;
   a secondary piston guide ring, a sleeve and a primary piston guide ring adapted to be fitted in this order into said cylinder from said one open end;
   a piston slidably fitted in an axial direction of said cylinder, into each of said secondary piston ring, said sleeve and said primary piston guide ring; and
   a retaining member provided at said open end of said cylinder, and adapted to abut against said primary piston guide ring and prevent escape of said primary piston guide ring from said cylinder,
   wherein an elastic member is provided between a rearwardly facing surface of said sleeve and an opposing forwardly facing surface of said primary piston guide ring so that the rearwardly facing surface of said sleeve and the forwardly facing surface of said primary piston guide ring always abut each other through said elastic member without these surfaces making direct contact.

2. A master cylinder according to claim 1, wherein said elastic member is a corrugated washer.

3. A master cylinder according to claim 2, wherein said washer is made of a plastic material.

4. A master cylinder according to claim 1, wherein at least one of said secondary piston guide ring, sleeve and primary piston guide ring is made of a plastic material.

5. A master cylinder according to claim 1, wherein said piston includes a secondary piston and a primary piston so that a primary pressure chamber is formed between said secondary piston, sleeve, primary piston guide ring and primary piston and wherein said master cylinder further comprises a seal provided between said sleeve and said secondary piston so that the fluid pressure in said primary pressure chamber is not transmitted to a gap between said secondary piston guide ring and said sleeve.

* * * * *